United States Patent [19]

Okino

[11] Patent Number: 4,768,876
[45] Date of Patent: Sep. 6, 1988

[54] IMAGE SENSING SYSTEM USING ILLUMINATING DEVICE

[75] Inventor: Tadashi Okino, Kanagawa, Japan

[73] Assignee: Canon Kabushiki Kaisha

[21] Appl. No.: 107,842

[22] Filed: Oct. 6, 1987

Related U.S. Application Data

[63] Continuation of Ser. No. 648,703, Sep. 7, 1984, abandoned.

[30] Foreign Application Priority Data

Sep. 8, 1983 [JP] Japan ................................ 58-165464
Sep. 28, 1983 [JP] Japan ................................ 58-179733
Oct. 5, 1983 [JP] Japan ................................ 58-186252

[51] Int. Cl.⁴ ........................ G01C 3/08; H04N 5/232
[52] U.S. Cl. ........................................ 356/4; 354/421; 354/195.11; 358/227; 358/225
[58] Field of Search ............... 358/225, 227, 213, 174, 358/909; 354/195.11, 421; 356/4

[56] References Cited

U.S. PATENT DOCUMENTS 3,583,299  6/1971  Land .................................... 354/421
4,203,661  5/1980  Bensenmatter ..................... 354/421
4,532,553  7/1985  Brill ................................... 358/227

Primary Examiner—Russell E. Adams
Attorney, Agent, or Firm—Toren, McGeady and Associates

[57] ABSTRACT

An imaging sensing system of the kind using an illuminating device includes an image sensing device which converts an image of an object to be photographed into an electrical signal, an indicating device which produces a distance signal corresponding to a distance to the object and a control device which controls the gain of the electrical signal of the image sensing device according to the distance signal of the indicating device or the illuminative power of the illuminating device.

19 Claims, 11 Drawing Sheets

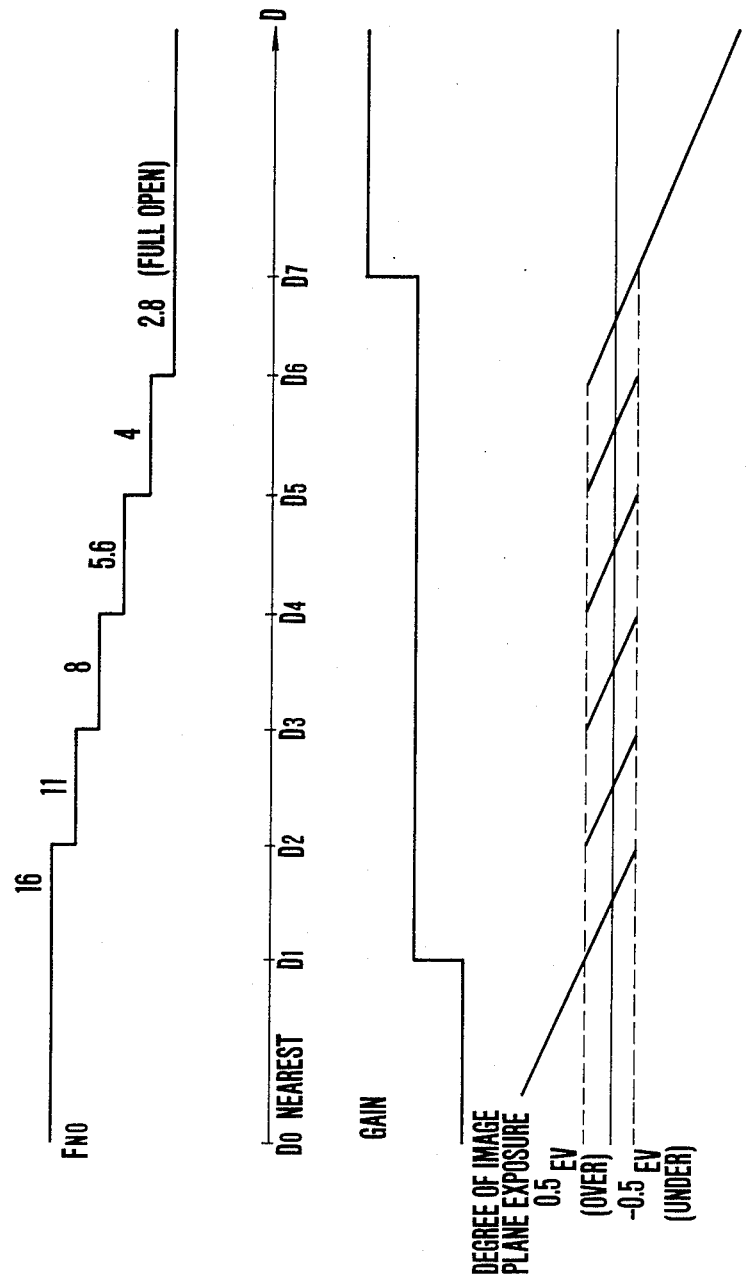

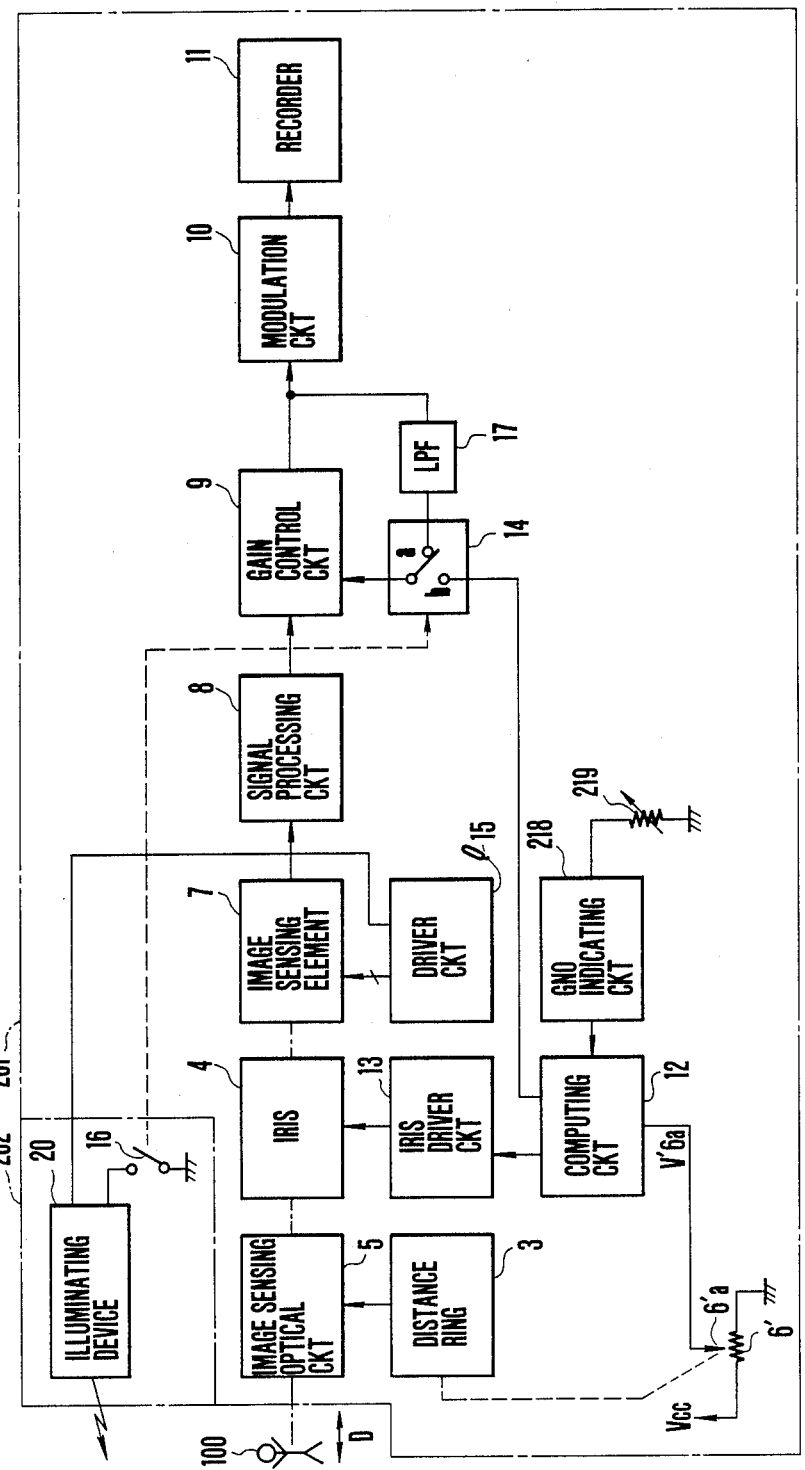

F I G. 9(a)
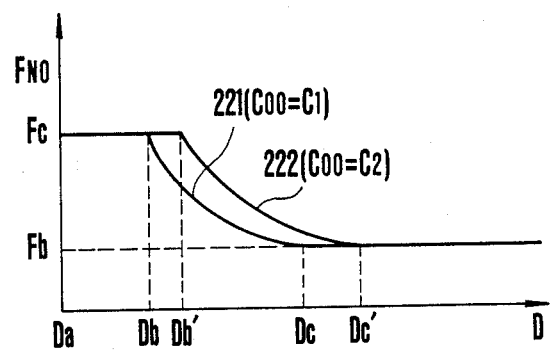
F I G. 9(b)
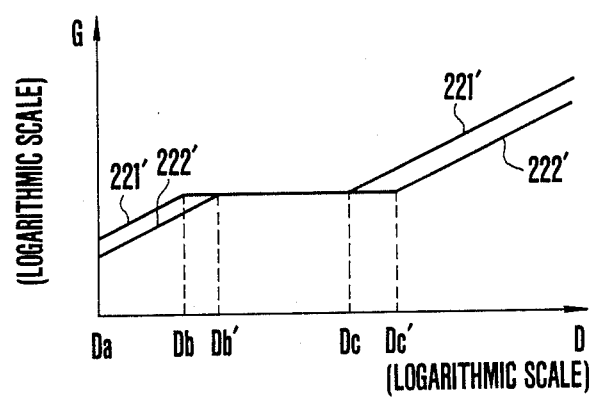

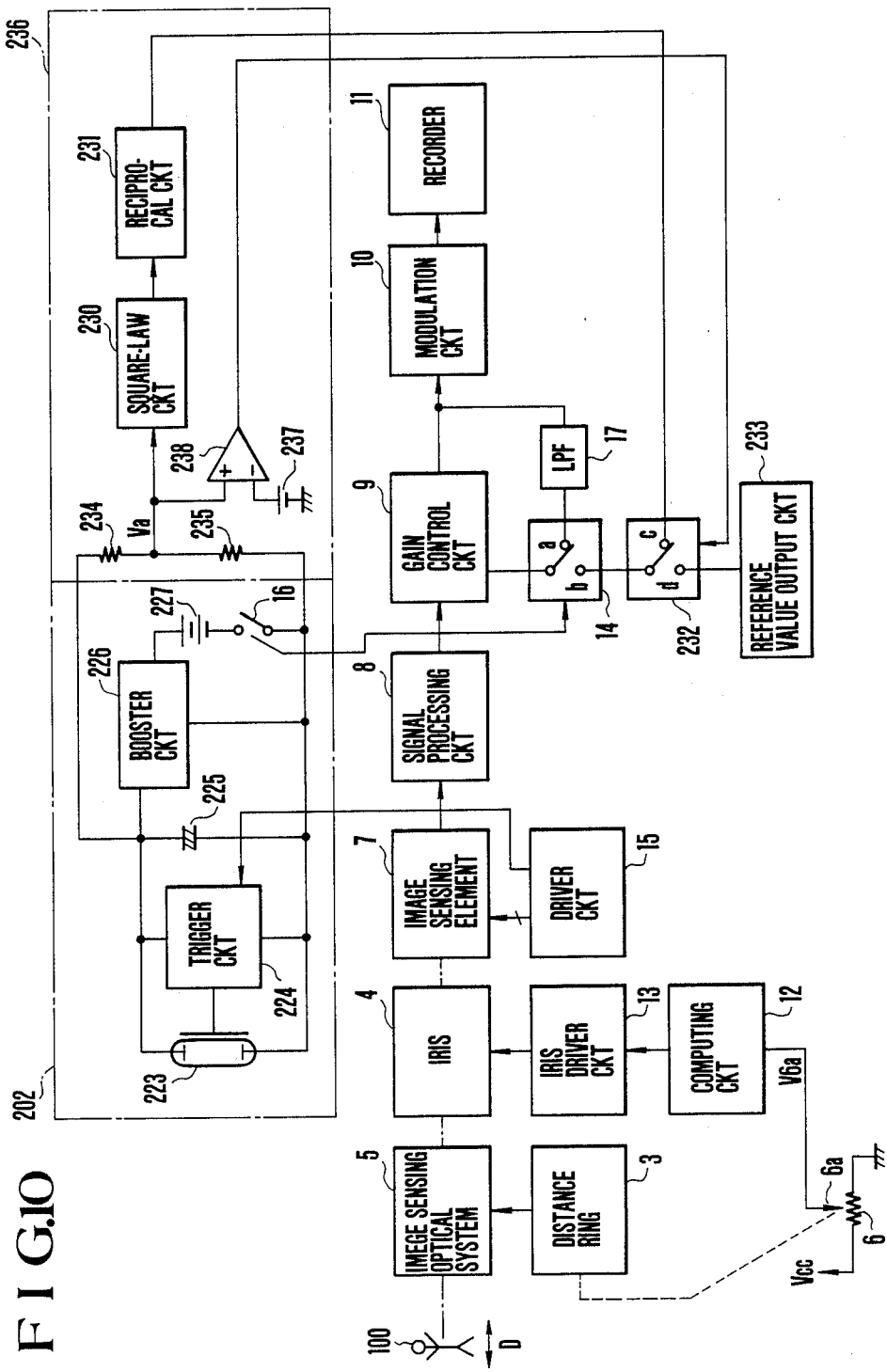
F I G. 10

IMAGE SENSING SYSTEM USING ILLUMINATING DEVICE

This is a continuation of application Ser. No. 648,703, filed Sept. 7, 1984, now abandoned.

BACKGROUND OF THE INVENTION

1. Field of the Invention

This invention relates to an image sensing system using an illuminating device which is disposed either within or without the system.

2. Description of the Prior Art

Previously, photographing in a dark place with the conventional camera of the type using a silver halide film has been carried out using an artificial illumination device such as a lamp or a flash device as an auxiliary illuminating means, because there is an increasable limit to the brightness of the photo-taking optical system or to the sensitivity of the film. The same situation occurs with an image sensing system of the kind using a CCD or a camera tube. However, artificial illuminating devices are capable of emitting only a relatively small quantity of light, the reachable distance of which is limited. With the camera of the conventional silver halide film type, an underexposure has been inevitable for an object located beyond the reach of the artificial illumination light. The same may be said of the image sensing system of the above-stated kind. In the case of the latter, the requirement for exposure accuracy is much more severe than the camera of the silver halide film type. A slight degree of underexposure results in a salient degradation of image quality. Video cameras and the like have employed an automatic gain control circuit (hereinafter will be called AGC for short) with a negative feedback loop for accurate exposure control. With the AGC employed, the average level of the signal transmitted to signal processing and recording circuits can be kept nearly constant irrespective of to whether the output of an image sensor is large or small. However, in the event that the exposure condition existing at the time of photographing becomes entirely different from the condition which existed at the time of the light measurement carried out prior to photographing, as in the case of flash photography, the above-stated arrangement of the prior art has been incapable of coping with such a change.

SUMMARY OF THE INVENTION

It is therefore an object of the present invention to provide an image sensing system which is capable of giving an image of fairly good quality even in cases where an object is located beyond the reach of an artificial light illuminating device or where the object is located at a distance closer than the stopping down limit of an iris diaphragm of the system.

It is another object of the invention to provide an image sensing system which uses an illuminating device and is capable of giving an adequate image information despite having a simple structural arrangement.

It is a further object of the invention to provide an image sensing system which uses an illuminating device and has a wider dynamic range than the prior art devices of the above-stated kind.

These and further objects and features of the invention will become apparent from the following detailed description of preferred embodiments thereof taken in connection with the accompanying drawings.

BRIEF DESCRIPTION OF THE DRAWINGS

FIG. 5 is a chart showing a control signal, etc. of a fourth embodiment.

FIG. 8 is a block diagram showing a sixth embodiment.

FIG. 9(a) is a graph showing a relation between the object distance and the iris aperture of the sixth embodiment.

FIG. 9(b) is a graph showing a relation between the object distance and the gain of the sixth embodiment.

FIG. 10 is a block diagram showing the arrangement of a seventh embodiment.

DETAILED DESCRIPTION OF THE PREFERRED EMBODIMENTS

Figure 1:
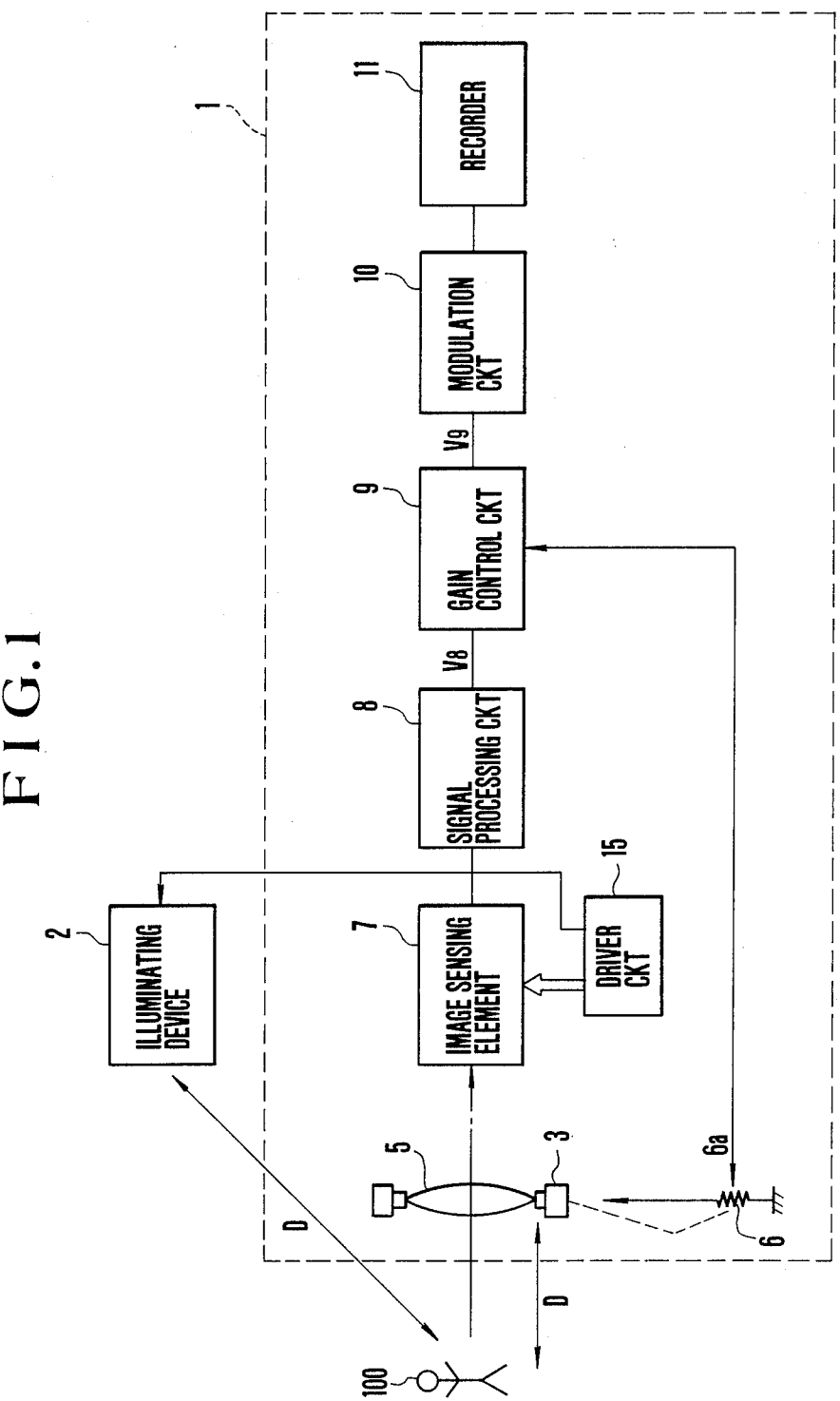
FIG. 1 is a block diagram showing a first embodiment of the invention.

The details of the invention will be described hereinafter with reference to the accompanying drawings, in which: FIG. 1 shows an image sensing system arranged as a first embodiment of the invention. Referring to FIG. 1, a reference numeral 1 denotes the image sensing system. An illuminating device 2, which includes an artificial illumination light source, is disposed either within or without the image sensing system. The light source may be either a lamp that continuously lights up or a flash light source. A distance adjustment ring 3 is arranged to adjust a distance between the lens and an image forming plane according to a distance to an object 100 to be photographed. As shown, the distance to the object from the image sensing system 1 and from the illuminating device 2 is assumed to be D. The system includes an image sensing optical system 5; and a potentiometer 6 which serves as indicating means in response to the distance adjustment ring 3. The potentiometer 6 is arranged to have a voltage V6a developed at the terminal 6a thereof in a value proportional to the square of the object distance D. This can be expressed as follows:

$$V_{6a} = kD^2 \qquad (1)$$

(wherein "k" represents a constant).

An image sensor element 7, which is provided as image sensing means, is arranged to convert an image of the object into an electrical video signal. A signal processing circuit 8 is arranged to perform γ conversion and contour correction. A gain control circuit 9 is arranged to serve as control means. The system further includes a modulation circuit 10; a recorder 11; and a driver circuit 15 which drives the image sensor element 7 and causes the illuminating device 2 to emit a light in synchronism with this driving action. The illuminating device 2, which includes the illuminating light source, is disposed in about the same position as the image sensing system in relation to the object 100. The system which is arranged as shown in FIG. 1 operates as follows:

A light coming from the object 100 passes through the optical system 5 to be imaged on the image sensor element 7. An image thus formed on the image sensor element 7 is photo-electrically converted into an electrical image signal by element 7. The electrical video signal thus produced from the element 7 is processed by the signal processing circuit 8. The processed signal is further processed through the gain control circuit 9 and the modulation circuit 10. After that, the signal is recorded on a record bearing medium or the like by the recorder 11.

When the illuminating light source disposed within the illuminating device 2 is arranged to be close to a spot light source, the intensity of illumination on the object 100 is inversely proportional to $D^2$ and that of the light incident upon the image sensor element 7 is also inversely proportional to $D^2$. Further, assuming that the image sensor element 7 has a linear photo-electric converting characteristic, the electrical video signal from the image sensor element 7 is also in inverse proportion to $D^2$. Then, a video signal V8 produced from the signal processing circuit is inversely proportional to $D^2$ and thus can be expressed as follows:

$$v8 = \frac{B}{D^2} \tag{2}$$

(wherein "B" represents a constant).

At the gain control circuit 9, the product of the terminal voltage 6a of the potentiometer 6 and the image video signal V8 is obtained. Then, from Formulas (1) and (2), the output V9 of the gain control circuit 9 becomes as follows:

$$V9 = kB = \text{constant} \tag{3}$$

The output V9 of the gain control circuit 9 thus becomes constant irrespective of the distance to the object, that is, irrespective of the illuminating condition. Therefore, the average level of the signal recorded is unvarying.

Figure 2:
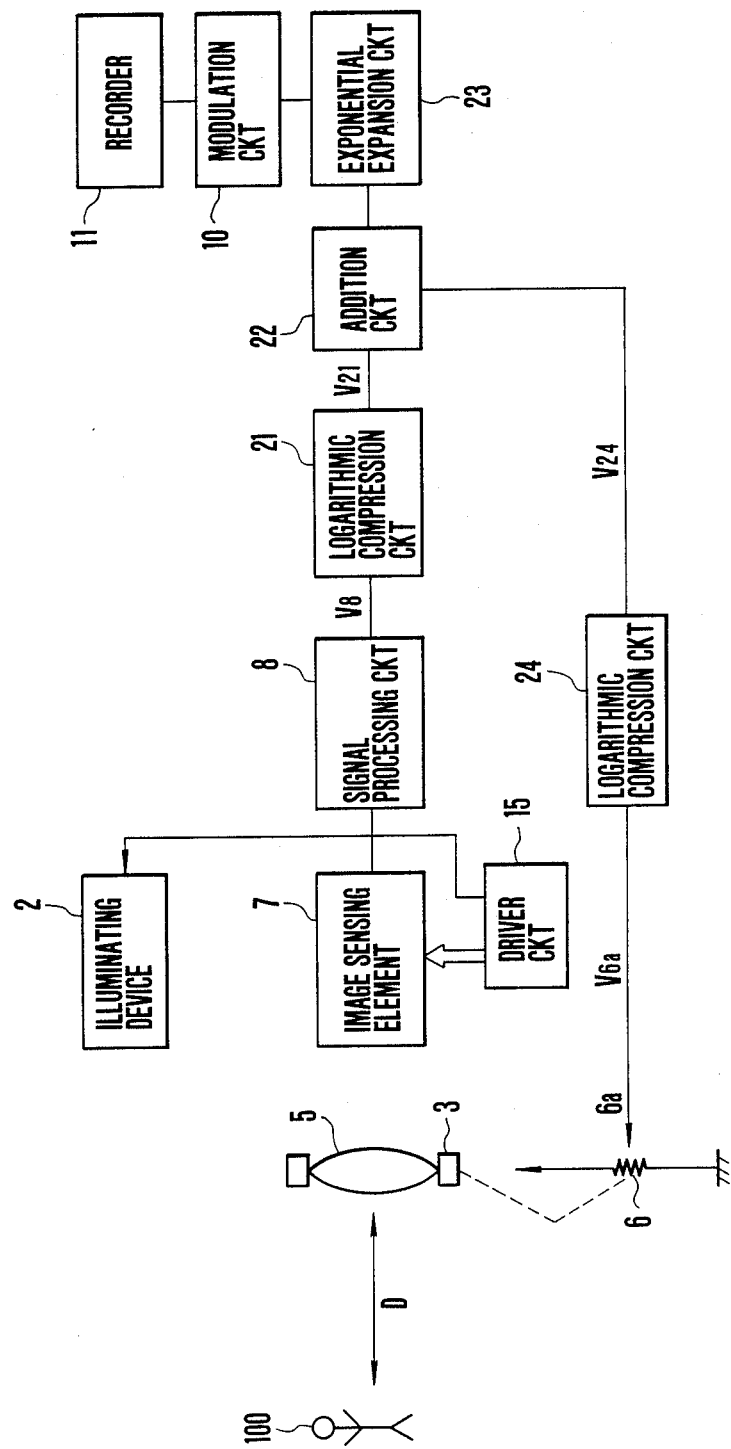
FIG. 2 is a block diagram showing a second embodiment of the invention.

In this particular embodiment, the gain control circuit 9 is arranged to perform multiplication. However, the same result can be obtained by changing this arrangement to that as shown in FIG. 2, which shows a second embodiment of the invention. In the case of the second embodiment, logarithmic compression circuits 21 and 24 are respectively arranged as expressed below:

$$V21 = A \log k D^2 \tag{4}$$

$$V24 = A \log V8 \tag{5}$$

(wherein "A" represents a constant.).

Then, in place of the gain control circuit 9, an addition circuit 22 is arranged to add the outputs V21 and V24 of the logarithmic compression circuits 21 and 24 to give thereby a result as expressed below:

$$V21 + V24 = A \log k D^2 V8 = A \log k B \tag{6}$$

The output of the addition circuit 22 is supplied to an exponential expansion circuit 23 to obtain an output which is expressed as follows:

$$\exp[(V21 + V24)/A] = k B \tag{7}$$

In the second embodiment, the addition circuit 22 serves as control means.

Figure 3:
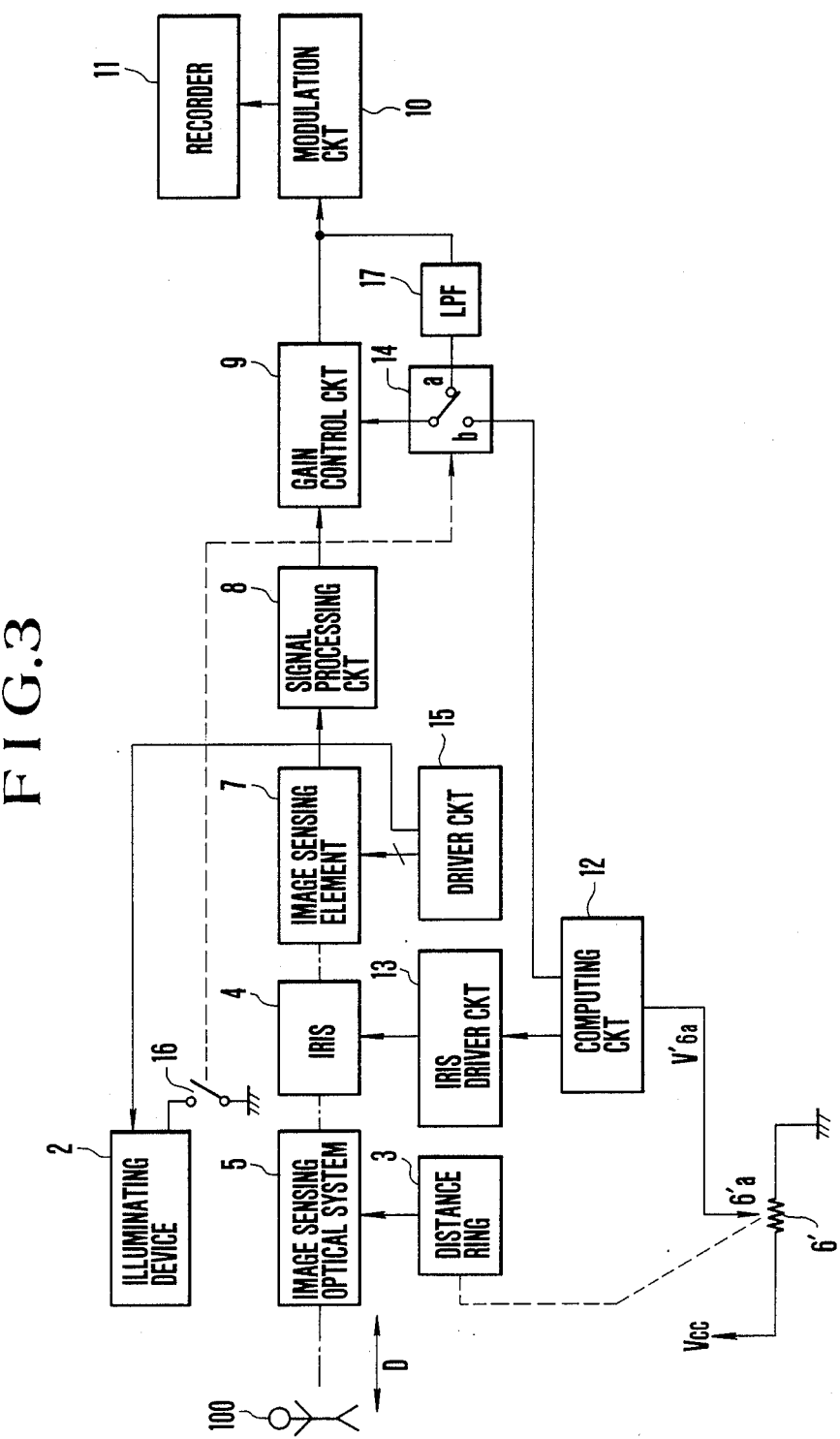
FIG. 3 is a block diagram showing a third embodiment.

FIG. 3 shows a third embodiment of the invention. The same elements as those shown in FIGS. 1 and 2 are indicated by the same reference numerals. The third embodiment includes an iris 4, which is arranged to restrict the quantity of light incident on the image sensing element and thus serves as stopping means; an iris driver circuit 13; a computing circuit 12; a switch circuit 14; and a light source circuit stand-by switch 16 which is arranged to have a peripheral circuit within the illuminating device stand by. For example, the switch 16 is arranged to cause a capacitor, which is provided for storing a light emission energy, to begin to be charged. With the switch turned on, the peripheral circuit of the light source is brought into a stand-by state. Then, the position of the switch 14 is shifted from a terminal "a" to another terminal "b". A low-pass filter 17 is disposed within the feedback loop of the gain control circuit 9.

Further, in this embodiment, the terminal voltage V6'a of the potentiometer 6' is arranged to give an output in proportion to the logarithm of the distance D according to the distance D. The output can be expressed as follows:

$$V6'a = F \log D \tag{8}$$

(wherein "F" represents a constant.).

The operation of the third embodiment is as follows: In illuminating an object to be photographed with the illuminating device 16 of FIG. 3, the switch 16 is first turned on to bring the peripheral circuit of the light source into a stand-by state. The distance adjustment ring 3 is then operated to adjust the lens. In association with this, the voltage V6'a of the terminal 6'a of the potentiometer 6' varies according to Formula (8). The computing circuit 12 performs a computing operation on the basis of the voltage thus obtained. The computing operation is performed in such a way as to obtain an aperture value in an F-number of FNO, that allows the image sensing system to have an unvarying exposure condition even when the object distance changes. More specifically, the computing circuit 12 of this embodiment performs the computing operation to give an output which can be expressed as follows:

$$FNo = \frac{C}{D} \tag{9}$$

(wherein "C" represents a constant.).

The iris driver circuit 13 is controlled to adjust the iris aperture to the aperture value thus determined by computation. The illuminating light source is caused to emit a light at a predetermined timing. The image sensor element 7 is then exposed to light through the optical system 5 and the iris 4. The element 7 then produces a signal which comes through the signal processing circuit 8, the gain control circuit 9 and the modulation circuit 10 to the recorder 11 to be recorded on a medium such as a magnetic disc, a magnetic tape, a semiconductor memory, an optical memory, or the like. An image sensing operation then comes to an end.

Figure 4A:
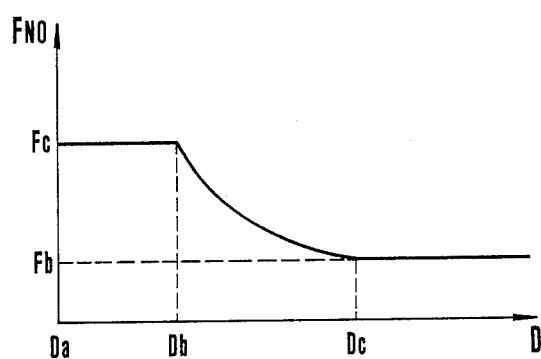
FIG. 4(a) is a graph showing a relation between the object distance and the iris aperture of the third embodiment.
Figure 4B:
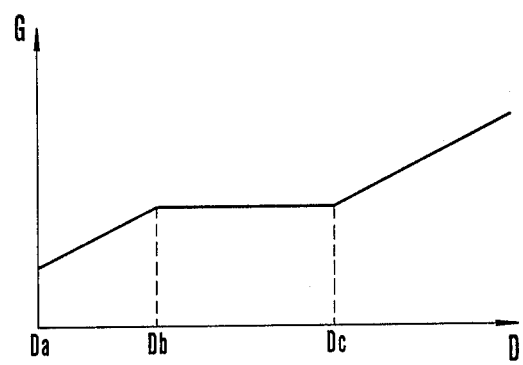
FIG. 4(b) is a graph showing a relation between the object distance and gain of the third embodiment.

Referring to FIG. 4(a), under a condition of Db≦D≦Dc, the aperture value FNo, which is produced from the computing circuit 12, satisfies a relation of FNo=(C/D). However, assuming that the full-open limit value of the iris 4 is Fb and the stopping-down limit value of the iris is Fc, the aperture value is constant and remains unchanged under a condition of D<Db or D>Dc. The computing circuit 12 of this embodiment is, therefore, arranged to produce a gain control signal for the purpose of controlling the gain of the gain control circuit as shown in FIG. 4(b). More specifically stated, the gain control signal is produced to control the gain control circuit 9 in such a manner that: The gain obtained by the gain control circuit 9 decreases accordingly, as the value D becomes smaller under a condition of D<Db; the gain becomes constant under a condition of Db≦D≦Dc; and the gain increases accordingly as the value D becomes larger under a condition of D>Dc.

Therefore, the signal which comes through the gain control circuit 9 is always at an adequate level and never degrades the picture quality.

In other words, within the range of Db≦D≦Dc, the signal level is stabilized although the gain is constant, because an adequate exposure level is obtainable by virtue of the iris. Within the range of D<Db or D>Dc, the iris aperture becomes fixed at the limit value and this is corrected by gain adjustment. The signal level, therefore, can be also stabilized.

In this embodiment, the position of the switch 14 is shifted to the side "a" when the switch 16 is turned off in carrying output normal photographing without using the illuminating light source. In that event, with the switch 14 shifted to the side "a", the output of the gain control circuit 9 is fed back via the low-pass filter 17 to the gain control circuit 9, so that the gain can be automatically adjusted. In that event, since the low-pass filter has a suitable time constant, the image sensing system is brought into a state suited for a continuous photographing operation.

FIG. 5 shows a fourth embodiment of the invention. In this embodiment, the control over the iris 4 in relation to the object distance D is not continuously performed as shown in Formula (9). The aperture of the iris 4 in this case is shifted stepwise. The iris aperture is shifted when an object distance becomes such that the exposure light quantity on the image plane is outside of a predetermined range at an aperture value. In this case, the relation represented by Formula (9) is arranged to be satisfied in the middle of a distance range corresponding to each aperture value. When the object distance exceeds a distance range D6–D7 which is within a predetermined range of exposure light quantity on the image plane with the iris fully opened, the gain of the gain control circuit 9 is increased in a stepwise manner. In the event that the object distance becomes shorter than a distance range D1–D2, which is within a predetermined range of exposure light quantity on the image plane with the iris aperture in a stopped down state, the gain of the gain control circuit is decreased in a stepwise manner. The gain is controlled to be constant within a distance range D1–D7. Further, in the same manner as in the case of the first embodiment, an AGC operation is performed by the gain control circuit when the switch is shifted to the side "a" with the switch 16 turned off.

In the foregoing description of the first to fourth embodiments, the gain of the electrical signal formed by the image sensing means is arranged to be adjusted by adjusting the gain of the gain control circuit. However, the gain may be adjusted, for example, by controlling the sensitivity of the image sensor means. In other words, in case that a camera tube is employed as image sensor, for example, the sensitivity thereof can be changed by controlling the level of a voltage impressed on the target electrode of the camera tube.

In the embodiments described, the illuminating light source is assumed to fully emit the light thereof. However, it goes without saying that the invention is applicable to a system arranged to restrict the emission light quantity by means of a light adjusting circuit during the process of light emission.

As described in the first and second embodiments, in adjusting the gain according to the object distance, the gain may be either continuously changed or changed in a dispersive stepwise manner.

Further, the potentiometer is arranged to operate, in response to the distance adjustment ring, as indicating means. However, the potentiometer may be replaced with, for example an automatic distance measuring device that is arranged to produce a signal according to the distance to the object. As described in the foregoing, these embodiments are capable of giving image signals of adequate levels over a wide range of distances without recourse to a large illuminating device in the event of photographing with artificial light illumination.

Figure 6:
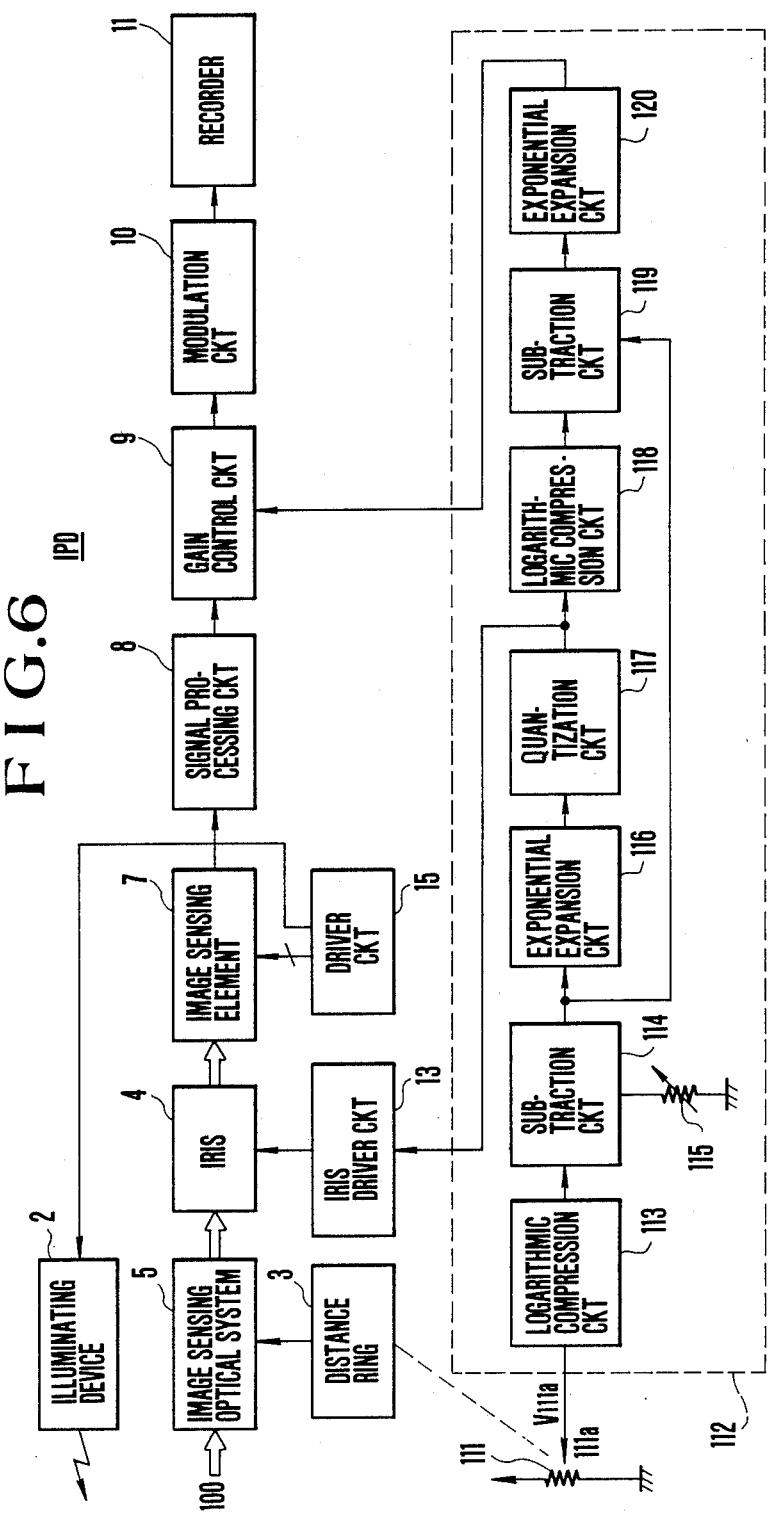
FIG. 6 is a block diagram showing an image sensing system arranged as a fifth embodiment.

FIG. 6 shows a fifth embodiment of the invention. In FIG. 6, the same elements as those shown in FIGS. 1 to 5 are indicated by the same reference numerals. A reference numeral 100 denotes the object to be photographed. This embodiment is provided with a potentiometer 111 which is employed as an object distance information producing means. The position of a voltage dividing terminal 111a of the potentiometer is 111 arranged to shift according to the rotating position of the distance adjustment ring 3. Therefore, voltage information, which varies with the object distance, is produced. In this embodiment, the voltage V111a produced from the terminal 111a is arranged to be in proportion to the object distance D and thus can be expressed as follows:

$$V_{111a} = kD \tag{10}$$

(wherein "k" represents a constant.)

This voltage V111a is supplied to a computing circuit 112 which is employed as a control means. The computing circuit 112 performs a computing operation on the voltage V111a. The output of the computing circuit 112 which is thus obtained is supplied to the iris driver circuit 13. By this, the iris 4 is controlled and adjusted to an aperture value corresponding to the output of the computing circuit 112. The output of the computing circuit 112 is supplied also to the gain control circuit 9 to have the gain of the gain control circuit 9 controlled thereby. The computing circuit 112 is arranged as described below:

The output V111a of the potentiometer is converted into a logarithm at a logarithmic compression circuit 113 and is produced therefrom as an output V113, which can be expressed as follows:

$$V_{113} = A \log D \tag{11}$$

(wherein "A" represents a constant.)

Then, a subtraction circuit 114 subtracts a reference value $V_{GNO}$ from this output V113. The reference value is set by means of a setting resistor 115 at the logarithm of a guide number GNO which is proportional to the square root of the brightness of the illuminating light source and satisfies the following condition:

$$V_{GNO} = B \log (G_{NO}) \quad (12)$$

(wherein "B" represents a constant.)

Accordingly, the output V114 of the subtraction circuit 114 becomes as follows:

$$\begin{aligned} V114 &= V_{GNO} - V113 \\ &= C \log \frac{G_{NO}}{D} \end{aligned} \quad (13)$$

(wherein "C" represents a constant.)

The output V114 of the subtraction circuit 114 is expanded in an exponential expansion circuit 116. The output V116 of the circuit 116 becomes as follows:

$$\begin{aligned} V116 &= \exp[(V_{GNO} - V113)/C] \\ &= G_{NO}/D \end{aligned} \quad (14)$$

Figure 7:
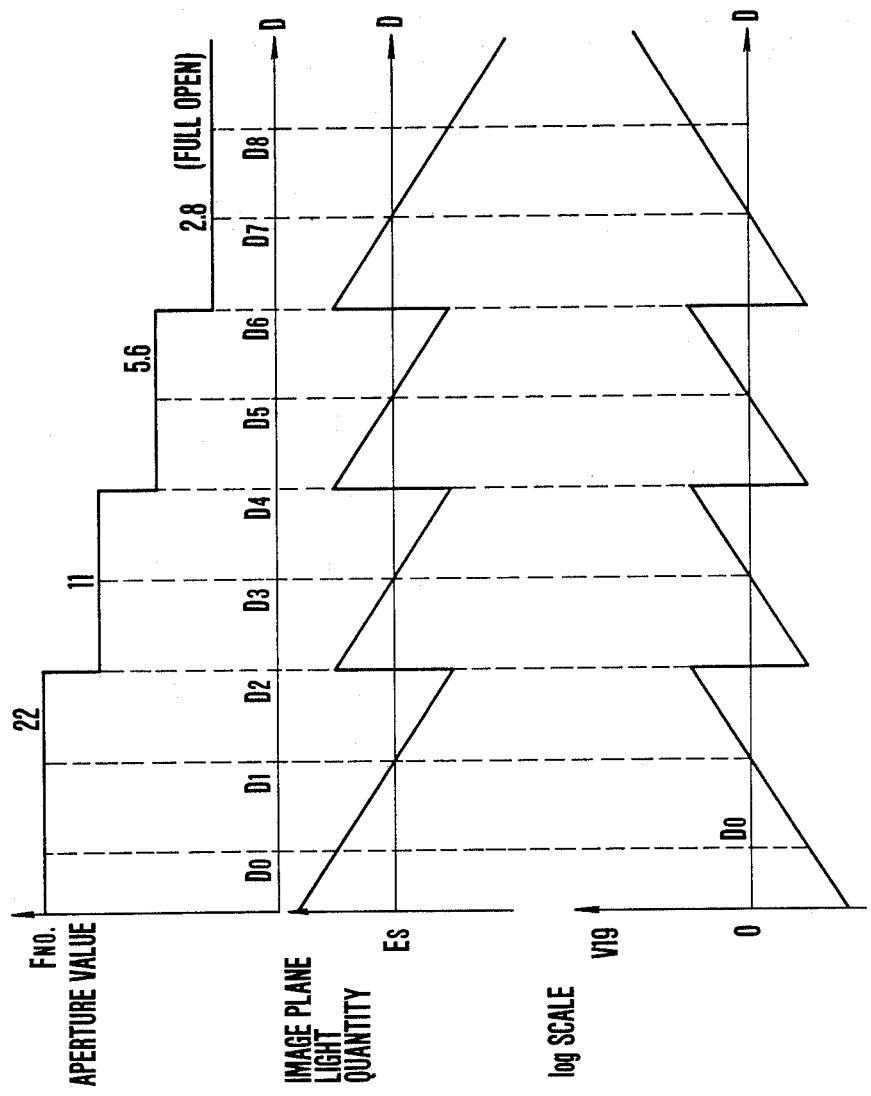
FIG. 7 is a chart showing the aperture value vs. the gain characteristic, etc. of the fifth embodiment in relation to the object distance.

This output V116 is quantized, in a stepwise manner, in a quantization circuit 117. A quantized output thus obtained is in the form of an output V117 which causes the aperture value FNo to change stepwise in relation to changes in the distance D as shown in FIG. 7. Meanwhile, the iris driver circuit 13 controls the iris 4 to make the aperture value FNo proportional to the value of the output V117. Since the output V117 thus changes stepwise relative to the aperture value V116 which is necessary for obtaining an apposite exposure value, there arises some exposure error, which can be expressed as follows:

$$\left(\frac{V116}{V117}\right)^2 = \left(\frac{G_{NO}}{D \times V117}\right)^2 \quad (15)$$

In this embodiment, this error is corrected by adjusting the gain with the gain control circuit 9, etc. More specifically, the output V117 of the quantization circuit 117 is converted into a logarithm by the logarithmic compression circuit 118 and the output V118 of the circuit 118 becomes as expressed below:

$$V118 = E \log V117 \quad (16)$$

(wherein "E" represents a constant.)

Then, the subtraction circuit 119 performs a subtracting operation on the output V118 of the logarithmic compression circuit 118 and the output V114 of the subtraction circuit 114 to produce an output V119 which can be expressed as follows:

$$\begin{aligned} V119 &= V118 - V114 \\ &= C \log \frac{G_{NO}}{D} - E \log V117 \\ &= H \log \frac{G_{NO}}{D \cdot V117} \end{aligned} \quad (17)$$

(wherein "H" represents a constant.)

Next, at the exponential expansion circuit 120, the output V119 is multiplied two-fold and, after that, is exponentially expanded. Then, the output V120 thus produced from the exponential expansion circuit 120 becomes as expressed below:

$$V120 = \left(\frac{D \times V117}{G_{NO}}\right)^2 \quad (18)$$

The output V120 is supplied to the gain control circuit 9 and the gain thereof is controlled to be in proportion to the value of this output V120. By this, in case that the aperture is arranged to be shifted in a non-continuous manner as shown in FIG. 7, the error which arises in the quantity of light on the image plane can be corrected.

In this specific embodiment, the logarithmically compressed output V118 is subjected to the subtracting operation. However, the subtracting operation of course may be replaced with some multiplying or dividing operation, etc. Further, the computing operation may be either a digital operation or an analog operation.

The stepwise shift of the aperture may be arranged to be carried out in any desired number of steps. In this embodiment, the distance information producing means is arranged to be the potentiometer which operates in response to the distance adjustment ring. However, in the event of an image sensing system provided with a distance measuring device, the distance measuring device may serve as the distance information producing means as its output corresponds to the distance information output desired. While this embodiment uses the gain control circuit for the purpose of changing the gain of the electrical signal produced from the image sensor element, the image sensor element may be arranged to vary its sensitivity. For example, the gain of the electrical signal of the image sensor element can be changed within the sensor element by adjusting a bias applied to the target electrode of the image sensing element.

In this embodiment of the invention, the image sensing system using the illuminating device is arranged to non-continuously shift the iris aperture in accordance with information on the object distance and to adjust the gain of the image sensing signal obtained at each aperture condition according to the object distance information. Therefore, the error in the exposure light quantity on the image plane which cannot be corrected by the aperture, can be corrected to ensure an adequate level of the picture signal. Further, the arrangement of the embodiment also permits reduction in the number of steps of exposure control for simplification thereof.

FIG. 8 shows a sixth embodiment of the invention. The same elements as those shown in FIGS. 1 to 7 are indicated by the same reference numerals. In the sixth embodiment, an illumination unit 202 consists of an illuminating device 20 and a switch 16. The unit 202 is attachable to and detachable from an image sensing system 201. The embodiment includes a guide number indication circuit 218 which is arranged to serve as the indicating means according to the invention. With the value of a setting resistor 219 adjusted to a guide number $G_{NO}$, which is representative of the light emitting power of the illuminating device 20, the indication circuit 218 produces a light emission power signal indicative of the guide number. With the guide number $G_{NO}$, which corresponds to the light emission power of the illuminating device mounted on the system, set by the setting resistor 219 and with the guide number information signal produced from the guide number indication circuit 218, when the lens distance is adjusted by means of the distance ring 3, the voltage V'6a of the terminal 6'a of the potentiometer 6' changes according to Formula (8). The computing circuit 12 then performs a computing operation on the basis of this voltage to obtain thereby such a aperture value FNo that permits the image sensing system to have an unvarying exposure condition when the object distance changes. More specifically stated, the computing circuit 12 operates to obtain an aperture value FNo which satisfies the following condition in the same manner as in the case of the third embodiment:

$$FNo = \frac{Coo}{D} \tag{19}$$

In the formula given above, "Coo" represents the guide number information which is indicated by the output signal of the indication circuit 218. The iris driver circuit 13 is controlled to adjust the aperture to this computed aperture value. The illuminating light source is allowed to emit its light at a predetermined timing. Then, the image sensing element 7 is exposed to a light coming via the optical system 5 and the iris 4. Referring to FIG. 9(a), curves 221 and 222 represents the aperture values FNo produced from the computing circuit 12. A reference symbol Fb represents the full-open limit value of the iris 4 and a symbol Fc the stopped-down limit value of the iris. The computed aperture value FNo remains unchanged under the condition of FNo<Fb and FNo>Fc. Therefore, within the range of Fb≦FNo≦Fc, there obtains a relation of FNo=(C/D) in the same manner as in the case of FIG. 4(a). The curves 221 and 222 show the aperture values obtained under conditions of Coo=C1 and Coo=C2, wherein there obtains a relation of C2>C1.

In this embodiment, the computing circuit is arranged to produce a gain control signal for controlling the gain of the gain control circuit 9 when it is outside of the responsive range of the iris as shown in FIG. 9(b). In other words, in the event of Coo=C1, the gain control signal controls the circuit 9 in such a manner that the gain due to the gain control circuit 9 decreases according as the object distance D decreases under a condition of D<Db; the gain of the gain control circuit 9 becomes unvarying under a condition of Db≦D≦Dc; and the gain due to the gain control circuit 9 increases according as the distance D increases under a condition of D>Dc as indicated by the curve 221'. In the case of Coo=C2, as represented by the other curve 222', the gain control signal produced from the computing circuit 12 controls the gain control circuit 9 in such a manner that the gain due to the gain control circuit 9 decreases accordingly, as the distance D decreases under a condition of D<Db'; the gain of the gain control circuit 9 becomes constant under a condition of Db'≦D≦Dc'; and the gain due to the gain control circuit 9 increases accordingly, as the distance D increases under a condition of D>Dc'. Therefore, the signal obtained through the gain control circuit 9 is always at an adequate level to ensure good picture quality.

In other words, the gain remains constant while the aperture value is within the range of Fb≦FNo≦F.c. Under that condition, an adequate exposure level is obtainable by virtue of the iris and the signal level is stable. Within a range of F<Fb and F>Fc, the aperture is fixed at a limit value. In that event, an error resulting from this is corrected by the gain adjustment, so that the signal level can be also stabilized.

In this embodiment, in carrying out an image sensing operation using the illuminating device, the aperture is controlled according to the object distance. Then, when the aperture becomes a constant value, the gain is corrected to ensure an adequate signal level. In that event, the gain correcting characteristic is adjusted according to the guide number of the illuminating light source, so that an adequate video signal can be obtained without fail. However, the invention is not limited to this arrangement. For example, the iris can be arranged to operate in relation to the object distance for the purpose of simplification of the structural arrangement of the system. In that case, the signal level also can be stabilized by forming the gain control signal in such a way as to obtain a gain value corresponding to the guide number.

Further, in this embodiment, the gain is arranged to be controlled according to two parameters including the guide number and the object distance when the iris is outside of a responsive range. However, in accordance with the invention, an image sensing system may be arranged to control the gain according solely to the guide number. In that event, a certain amount of error of course might be included in the level of the video signal according to the object distance.

In accordance with the arrangement of the sixth embodiment, a video signal of an adequate level can be obtained even in the event that the light emission power of the illuminating device comes to vary due to replacement of the illuminating device with another interchangeable illuminating device.

FIG. 10 shows a seventh embodiment of the invention. In FIG. 10, the same elements as those shown in FIGS. 1-8 are indicated by the same reference numerals. The seventh embodiment uses a flash light source 223 which is, for example, a xenon tube. A trigger circuit 224 is arranged to supply a trigger pulse to the trigger electrode of the flash light source 223. A flashing trigger signal is arranged to be produced from an image sensor element driver circuit 15 and to be supplied to the control terminal of the trigger circuit 224. The trigger signal causes the flash light source 223 to flash in synchronism with a timing at which the image sensor element is driven. A main capacitor 225 is arranged to be charged with an electric energy required for flashing by the flash light source 223. A booster circuit 226 is arranged to boost the voltage of a DC power source into a high voltage and guide it to the capacitor 225. A stand-by switch 16 which is also employed in the preceding embodiment is arranged to permit a charging process on the capacitor when it turns on.

The embodiment is provided with a gain correction circuit 236, including resistors 234 and 235 which are arranged to divide the charge voltage of the capacitor 225 and to produce a flashing power signal indicative of the charge voltage, i.e. the light emitting capability of the xenon tube; a square-law circuit 230 which multiplies the voltage divided potential Va by itself; and a reciprocal number circuit 231 which is arranged to obtain the reciprocal of the output of the square-law circuit 230. These resistors 234 and 235, etc. form indicating means. The embodiment is further provided with a switch circuit 232; a reference value producing circuit 233, which is arranged to produce a reference value $V_{GO}$; a comparator 238; and a reference voltage source 237, which is connected to the inversion input terminal of the comparator 238 and produces a reference voltage Vth.

The comparator 238 controls the switch 232 to connect it to one side "c" when the divided potential Va is lower than the reference voltage Vth and to the other side "d" when the potential Va is higher than the reference voltage Vth. The comparator 238 has some time constant in its inside and is thus arranged to hold the output thereof for a while even when the main capacitor momentarily discharges.

Figure 11:
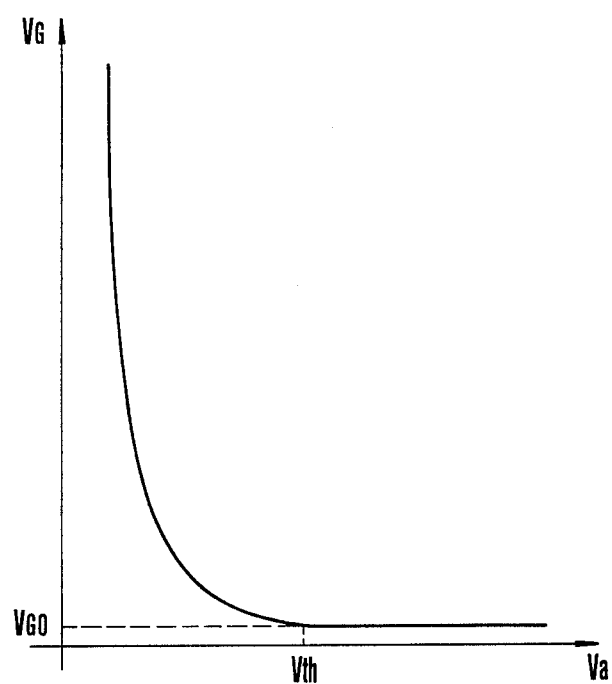
FIG. 11 is a graph showing a relation between a charge voltage and the gain of the seventh embodiment.

FIG. 11 shows the divided voltage Va in relation to the voltage $V_G$ which is supplied to the gain control circuit 9. Within the range of Va>Vth, there obtains a relation of $V_G = V_{GO}$ as the switch 232 is connected to the side "d" as shown in the drawing. In the event of Va≦Vth, there obtains a relation of $$V_G = \frac{B}{Va^2}$$

(wherein "B" represents a constant) as the switch 232 as connected to the other side "c".

The seventh embodiment operates as follows: During a photographing operation under an ordinary daylight condition or the like, the switch 16 remains off and, therefore, the gain control circuit 9 is automatically performing gain control to give a signal the average level of which always becomes a predetermined level by having a negative feedback from the output of the low-pass filter 17 in the same manner as in the embodiment shown in FIG. 8.

In the event of flash photography, when the switch 16 is turned on, the switch 14 shifts to the side "b" thereof. Then, the booster circuit 226 applies a high voltage to the main capacitor 225 to rapidly charge the capacitor 225. During the process of this charging operation, the level of the divided potential Va is compared with the reference voltage Vth by the comparator 238. The switch 232 is connected to the side "c" thereof until the level of the potential Va comes to exceed the reference voltage Vth. Therefore, a voltage $$V_G = \frac{B}{Va^2}$$

is impressed on the gain control circuit 9. Accordingly, the lower the charge voltage of the capacitor 225, the higher the gain of the gain control circuit 9 will be. The gain is thus controlled to become lower according as the charge voltage increases. Generally, the brightness of the illuminating device 2 is approximately in proportion to the square of the charge voltage of the capacitor 225. Therefore, the variations of brightness in the final video signal output due to variation in the charge voltage of the capacitor 225 can be completely corrected by obtaining the square of the charge voltage of the capacitor 225 and by controlling the gain of the video signal to adjust it to a value proportional to the receiprocal of the square of the charge voltage of the capacitor 225. Further, as mentioned in the foregoing, the switch 232 shifts to the side "d" when the potential Va comes to exceed the voltage Vth. Therefore, the gain is controlled to be at a constant voltage. When a trigger button (not shown) is turned on at an arbitrary timing, the trigger circuit 224 is triggered in synchronism with the driving timing of the image sensing element which has already been driven. Then, a trigger pulse is impressed on the trigger electrode of the xenon tube 223 and the tube 223 begins to flash.

The object to be photographed is illuminated by this flashing light. A reflection light resulting from this illumination comes from the object to the image sensing element via the image sensing optical system 5 and the iris 4.

Then, the output of the potentiometer 6 varies with the object distance and the iris aperture is adjusted accordingly. The image incident on the image sensor element 7 is photo-electric converted. After that, the converted image is linearly scanned by the driver circuit 15. The scanned image is thus read out as a time series signal and is signal processed at the signal processing circuit 8. The processed signal is supplied to the gain control circuit 9 and the modulation circuit 10 to be recorded at the recorder 11.

In this instance, the gain of the gain control circuit 9 is adjusted according to the charge voltage obtained before flashing, i.e. according to the light emission power of the light source. Therefore, a video signal of an adequate level is always obtainable from the gain control circuit 9. The video signal thus obtained is free from the adverse effects of the rise characteristic of the charge voltage of the charging capacitor and variations in the flashing capacity of the illuminating device resulting from aging deterioration, etc.

As described in the foregoing, the embodiment is provided with the image sensor means which converts the object image into an electrical signal; the indicating means which produces a signal corresponding to the light emitting or flashing power of the illuminating device; and the control means which controls the gain of the electrical signal obtained from the image sensor in accordance with the flashing or light emitting power indicated by the indicating means. Therefore, in cases where the light emitting power of the illuminating device changes when the illuminating device unit is replaced with another illuminating device unit or when it changes due to a rise of the charge voltage of the charging capacitor of the illuminating device or by the aging deterioration thereof, the arrangement of this embodiment is capable of giving video signals always at an adequate level. Therefore, a wide dynamic range can be obtained against the variations of the light emitting power of the illuminating device.

What is claimed is:

1. An image sensing system using an illuminating device, comprising:
    (a) image sensing means for converting an image of an object into an electrical video signal;
    (b) indicating means for producing a distance signal indicative of a distance from said image sensing means to the object; and
    (c) control means for controlling the gain of the electrical video signal of said image sensing means arcording to the distance signal produced from said indicating means.

2. A system according to claim 1, wherein said indicating means includes a distance measuring device for forming a distance measurement signal.

3. A system according to claim 1, wherein said indicating means includes a distance information setting member.

4. A system according to claim 3, wherein said distance setting member includes a distance adjustment ring of a lens barrel.

5. A system according to claim 1, wherein said control means includes a gain control circuit disposed within an output processing system provided for processing the output of said image sensing means.

6. A system according to claim 1, wherein said control means is arranged to control the sensitivity of said image sensing means.

7. An image sensing system using an illuminating device, comprising:
 (a) image sensing means for converting an image of an object into an electrical video signal;
 (b) indicating means for producing a signal indicative of the light emitting power of said illuminating device; and
 (c) control means for controlling the gain of said electrical video signal of said image sensing means according to the light emitting power signal produced from said indicating means.

8. A system according to claim 7, wherein said control means includes a gain control circuit disposed within an output processing system provided for processing the electrical video signal output of said image sensing means.

9. A system according to claim 7, wherein said control means is arranged to control the sensitivity of said image sensing means.

10. A system according to claim 7, wherein said indicating means produces a signal corresponding to the maximum quantity of light to be emitted by said illuminating device.

11. A system according to claim 7, wherein said indicating means produces a signal corresponding to the power of the light emitting energy source of said illuminating device.

12. An image sensing system using an illuminating device, comprising:
 (a) image sensing means for converting an image of an object into electrical signal;
 (b) iris means for restricting the quantity of light of the object incident on said image sensing means;
 (c) object distance information producing means for producing information on a distance from said image sensing means to the object; and
 (d) control means for non-continuously shifting the aperture of said iris means according to the distance information produced from said object distance information producing means and for changing the gain of said electrical signal obtained at each aperture according to the output of said distance information producing means.

13. A system according to claim 12, wherein said object distance information producing means includes a distance measuring device which forms a distance measurement signal.

14. A system according to claim 12, wherein said object distance information producing means includes a distance information setting member.

15. A system according to claim 14, wherein said object distance information setting member includes a distance adjustment ring of a lens barrel.

16. A system according to claim 12, wherein said control means includes a gain control circuit disposed within an output processing system provided for processing the electrical video signal output of said image sensing means.

17. A system according to claim 12, wherein said control means is arranged to control the sensitivity of said image sensing means.

18. An image sensing method comprising the steps of:
 (a) converting an image of an object into an electrical video signal;
 (b) forming a distance signal corresponding to a distance from said image sensing means to the object; and
 (c) controlling, on the basis of said distance signal, the gain of said video signal obtained by said image converting step.

19. An image sensing method using an illuminating device, comprising the steps of:
 (a) converting an image of an object into an electrical video signal;
 (b) forming a light emitting power signal corresponding to the light emitting power of said illuminating device; and
 (c) controlling, on the basis of said light emitting power signal, the gain of said electrical video signal obtained by said image converting step.

* * * * *